(12) United States Patent
Stallings et al.

(10) Patent No.: US 9,785,341 B2
(45) Date of Patent: Oct. 10, 2017

(54) INTER-APPLICATION NAVIGATION APPARATUSES, SYSTEMS, AND METHODS

(75) Inventors: Heath Stallings, Colleyville, TX (US); Sok Young Hwang, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1318 days.

(21) Appl. No.: 12/650,948

(22) Filed: Dec. 31, 2009

(65) Prior Publication Data

US 2011/0161878 A1 Jun. 30, 2011

(51) Int. Cl.
| | |
|---|---|
| G06F 3/0482 | (2013.01) |
| G06F 3/0488 | (2013.01) |
| G06F 3/0485 | (2013.01) |
| H04M 1/725 | (2006.01) |
| H04M 1/2745 | (2006.01) |

(52) U.S. Cl.
CPC ........ *G06F 3/04883* (2013.01); *G06F 3/0482* (2013.01); *G06F 3/0485* (2013.01); *H04M 1/27455* (2013.01); *H04M 1/72586* (2013.01); *G06F 2203/04804* (2013.01); *G06F 2203/04805* (2013.01); *H04M 1/274508* (2013.01); *H04M 2250/22* (2013.01)

(58) Field of Classification Search
CPC .............. G06F 3/0482; G06F 3/04855; H04M 1/72522; H04M 1/72586
USPC ......................................... 715/744, 776, 811
See application file for complete search history.

(56) References Cited

U.S. PATENT DOCUMENTS

| | | | | |
|---|---|---|---|---|
| 5,664,127 | A * | 9/1997 | Anderson et al. ............ | 715/776 |
| 6,934,911 | B2 * | 8/2005 | Salmimaa et al. ............ | 715/744 |
| 7,174,370 | B1 * | 2/2007 | Saini ....................... | H04L 67/10 709/220 |
| 7,260,390 | B1 * | 8/2007 | Skinner et al. ............... | 455/420 |
| 8,375,334 | B2 * | 2/2013 | Nakano ................. | G06F 1/1626 715/810 |
| 8,510,271 | B1 * | 8/2013 | Tsaur .................. | G06F 11/1451 707/640 |
| 8,635,236 | B2 * | 1/2014 | Lee ....................... | G06F 3/0482 707/758 |
| 2002/0129171 | A1* | 9/2002 | Coiner ................... | G06F 9/543 719/310 |
| 2005/0091604 | A1* | 4/2005 | Davis .................... | G06F 3/0482 715/772 |

(Continued)

*Primary Examiner* — Alvin Tan

(57) ABSTRACT

Inter-application navigation apparatuses, systems, and methods are disclosed. An exemplary method includes a computing system accessing a plurality of applications, generating an application access history specifying an order by which the applications are accessed by the computing system, and displaying an inter-application navigation user interface including a plurality of user-selectable graphical objects representing the plurality of applications accessed by the mobile phone device, the user-selectable graphical objects arranged in a slideable list within the inter-application navigation user interface based on the application access history. The plurality of applications represented by the plurality of user-selectable graphical objects in the inter-application navigation user interface includes an application being executed by the computing system and an application not being executed by the computing system when the inter-application navigation user interface is displayed. Corresponding apparatuses, systems, and methods are also disclosed.

18 Claims, 10 Drawing Sheets

(56) References Cited

U.S. PATENT DOCUMENTS

| | | | |
|---|---|---|---|
| 2005/0210412 A1* | 9/2005 | Matthews | G06F 9/4443 715/835 |
| 2007/0052725 A1* | 3/2007 | Ostojic | G06F 3/0482 345/625 |
| 2009/0154082 A1* | 6/2009 | Nurmi | G06F 1/1624 361/679.3 |
| 2011/0087989 A1* | 4/2011 | McCann | G06F 3/04817 715/772 |

* cited by examiner

INTER-APPLICATION NAVIGATION APPARATUSES, SYSTEMS, AND METHODS

BACKGROUND INFORMATION

Electronic devices continue to increase in complexity and functionality. This poses several challenges to designers of such devices. For example, it may be difficult for a designer to develop and provide an intuitive, functional, and convenient user interface for certain electronic devices, especially for devices that are small in size, have limited input mechanisms, and/or have robust functionality.

To illustrate, mobile phone devices, which were previously used for voice communications only, are increasingly being used to execute a variety of applications. The proliferation of various applications onto mobile phone devices has challenged designers of user interfaces for such electronic devices. For example, there remains room to improve mobile phone user interfaces, as well as user interfaces of other electronic devices, to facilitate convenient, functional, and/or intuitive user navigation from one application to another application available on a device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary inter-application navigation apparatuses, systems, and methods are described herein. In certain embodiments, for example, an inter-application navigation user interface may be provided and may facilitate convenient and/or intuitive navigation between applications that are available for accessing by a computing system. The inter-application navigation user interface may function as a quick-access portal configured to enable a user of a device to quickly navigate to any application, application instance, and/or application section that has been previously accessed by the device. For example, a user activity that has been previously performed using a device may be quickly accessed again through an inter-application navigation user interface.

Exemplary embodiments of inter-application navigation apparatuses, systems, and methods will now be described in more detail with reference to the accompanying drawings.

Figure 1:
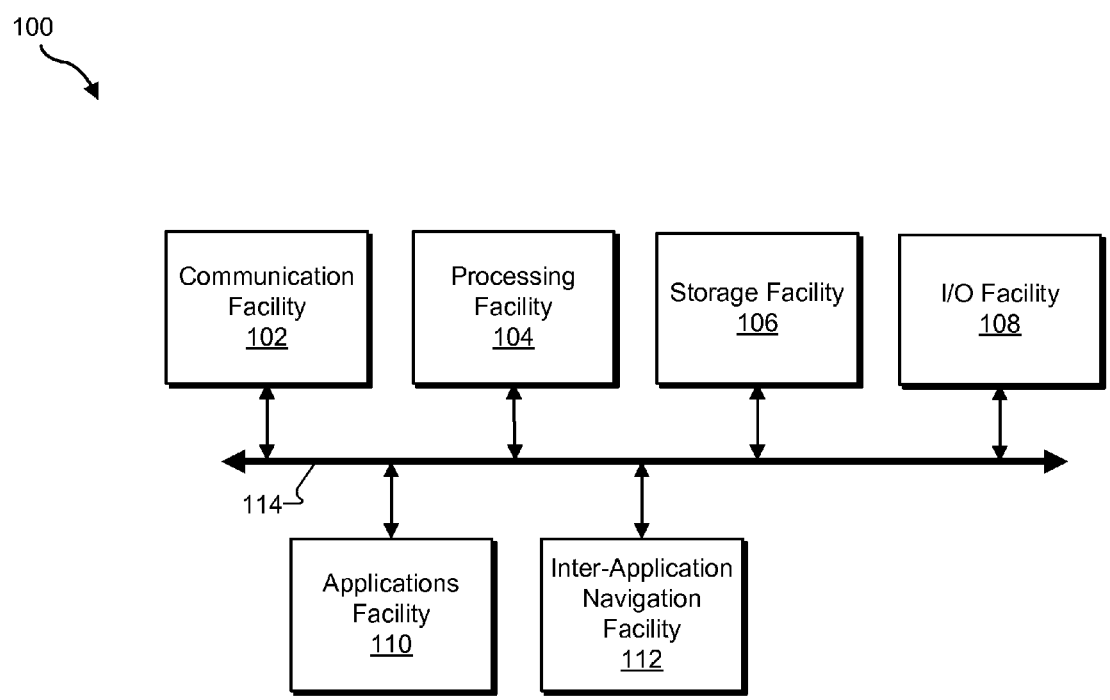
FIG. 1 illustrates an exemplary inter-application navigation system.

FIG. 1 illustrates an exemplary inter-application navigation system 100 (or simply "system 100"). As shown in FIG. 1, system 100 may include a communication facility 102, a processing facility 104, a storage facility 106, input/output ("I/O") facility 108, an applications facility 110, and an inter-application navigation facility 112 communicatively connected to one another by a communication infrastructure 114. The facilities 102-112 may be communicatively connected using any suitable technologies and may communicate using any communication platforms and/or technologies suitable for transporting communications, data, and/or signals between the facilities 102-112.

In certain embodiments, system 100 or one or more components of system 100 may include or be implemented by a computing system having computer hardware, computer-implemented instructions (e.g., software), or combinations of computer-implemented instructions and hardware, configured to perform one or more of the processes described herein. In particular, it should be understood that components of system 100 may be implemented on one physical computing device or may be implemented on more than one physical computing device. Accordingly, components of system 100 may include any one of a number of computing devices, and may employ any one of a number of computer operating systems.

Accordingly, one or more of the processes described herein may be implemented at least in part as instructions executable by one or more computing systems and/or devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Accordingly, each of the facilities 102-112 may be implemented as hardware, computing instructions (e.g., software) embodied on at least one tangible computer-readable medium, or a combination of hardware and tangibly embodied computing instructions configured to perform one or more of the processes described herein. In certain embodiments, for example, inter-application navigation facility 112 and/or one or more other facilities may be implemented as one or more software applications embodied on a computer-readable medium such as storage facility 106 and/or other memory and configured to direct processing facility 104 to execute one or more of the processes described herein.

The components of system 100 shown in FIG. 1 are illustrative only. Other embodiments may add, omit, or reconfigure one or more components. In certain embodiments, for example, communication facility 102 may be omitted. Each of the facilities 102-112 will now be described in more detail.

Communication facility 102 may be configured to send and/or receive communications to/from one or more external devices (e.g., a server and/or an RF transceiver). Communication facility 102 may include and/or employ any device, logic, communication media, communication protocols, and/or other technologies suitable for transmitting and receiving communications signals and data. Examples of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Long Term Evolution ("LTE") technologies, Code Division Multiple Access ("CDMA") technologies, Time Division Multiple Access ("TDMA") technologies, Short Message Service ("SMS"), Multimedia Message Service ("MMS"), Evolution Data Optimized Protocol ("EVDO"), radio frequency ("RF") signaling technologies, radio transmission technologies (e.g., One Times Radio Transmission Technology ("1× RTT")), signaling system seven ("SS7") technologies, Ethernet, in-band and out-of-band signaling technologies, Fiber-to-the-premises ("FTTP") technologies, Passive Optical Network ("PON") technologies, and other suitable communications networks and technologies.

Processing facility 104 may include one or more processors and may be configured to execute and/or direct execution of one or more processes or operations described herein. Processing facility 104 may direct execution of operations in accordance with computer-executable instructions such as may be stored in storage facility 106 or another computer-readable medium. As an example, processing facility 104 may be configured to process data, including demodulating, decoding, and parsing acquired data, and encoding and modulating data for transmission by communication facility 102. Processing facility 104 may be configured to access, execute, and/or terminate one or more software applications such that the software applications may be run and/or terminated on one or more computing devices.

Storage facility 106 may include one or more data storage media, devices, or configurations and may employ any type, form, and combination of storage media. For example, the storage facility 106 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Electronic data may be temporarily and/or permanently stored in the storage facility 106.

I/O facility 108 may be configured to receive user input and provide user output and may include any hardware, firmware, software, or combination thereof supportive of input and output capabilities. For example, I/O facility 108 may include one or more devices for capturing user input, including, but not limited to, a microphone, speech recognition technologies, keyboard or keypad, receiver (e.g., an RF or infrared receiver), and one or more input buttons. I/O facility 108 may include one or more devices for presenting output to a user, including, but not limited to, a graphics engine, a display device (e.g., a display screen), one or more output drivers (e.g., display drivers), one or more audio speakers, and one or more audio drivers.

In certain embodiments, I/O facility 108 may include a touch screen display supportive of touch screen input and/or output capabilities. For example, the touch screen display may include one or more sensors configured to sense one or more objects touching a surface of the touch screen display. An object touch on the touch screen may be sensed in any suitable way and using any suitable sensor technologies, including capacitance, heat, and/or optic sensor technologies, for example. The touch screen display may be configured to concurrently display one or more graphical user interfaces ("GUIs") and to sense one or more object touches on the touch screen display. The touch screen display may display a GUI and sense one or more object touches on the touch screen display within the context of the displayed GUI.

Applications facility 110 may include one or more applications configured to be accessed, executed, and/or terminated by processing facility 104. For example, applications facility 110 may include a plurality of software and/or firmware applications embodied on at least one tangible computer readable medium and configured to direct processing facility 104 to execute one or more operations of the applications. Examples of such applications may include, but are not limited to, communications applications (e.g., a voice communication application, a voice call log application, a recent voice calls application, a text messaging application, a media messaging application, an electronic mail application, a push-to-talk application, and a voice dialing application), web browser applications, address book applications (e.g., a "contacts" application maintaining data for one or more contacts), calendar applications, media player applications, menu applications (e.g., a menu of applications such as a desktop application), data management applications (e.g., a "my photos" application, a "my music" application, and a "my videos" application), third-party applications, and any other applications available to be accessed, executed, and/or terminated by processing facility 104.

When execution of an application within applications facility 110 is initiated, an instance of the application (i.e., an "application instance") may be created and executed by processing facility 104. The application instance may continue to run until it is closed (e.g., in response to a user closing the application instance). When the application instance is closed, the application instance is terminated such that the application instance is no longer being executed by processing facility 104.

Certain applications may allow for concurrent execution of multiple application instances (i.e., "multi-instance applications"). For example, multiple instances of an application may be executed concurrently by processing facility 104. Other applications may limit execution to a single application instance (i.e., "single-instance applications"). Applications facility 110 may include multi-instance applications, single-instance applications, or a combination of multi-instance and single-instance applications. Accordingly, at a given time, processing facility 104 may be executing one or more application instances associated with one or more applications within applications facility 110.

Applications facility 110 may include one or more applications stored in a computer-readable medium local to a device and configured to be executed locally on the device. Additionally or alternatively, applications facility 110 may include one or more applications stored remotely of a device and accessible to the device. Accessing of such remote applications by a device may include executing the applications remotely, locally, or a combination thereof.

Accordingly, one or more applications within applications facility 104 may be accessed locally and/or remotely and executed by processing facility 104. Thus, as used herein, the phrase "accessing an application," may refer to performance of one or more operations associated with local and/or remote execution of an application. For example, accessing of an application may include initiating a local or remote execution of the application. As another example, accessing of an application may include activating a GUI associated with the application, such as by making the GUI active to receive user input therein. As another example, accessing of an application may include displaying a GUI associated with the application at a forefront of a display.

In addition, accessing of an application may be specific to an application instance and/or to one or more sections within the application or application instance. For example, an application may be associated with various data records. Each data record may be referred to as a section within the application. Accordingly, an accessing of an application may include an accessing of a specific data record associated with the application. For instance, an accessing of a "contacts" application may include an accessing of a specific "contact" data record within the application. As another example, an application may include various types of data records, and each data record type may be referred to as a section within the application. Accordingly, an accessing of an application may include an accessing of a specific data record type associated with the application. For instance, an accessing of a voice communications application may include an accessing of a "recent calls" type of data records within a section of the voice communications application.

Inter-application navigation facility 112 may be configured to facilitate user navigation between applications within application facility 110. As described in more detail further below, inter-application navigation facility 112 may be configured to generate an application access history specifying an order by which one or more applications have been accessed by processing facility 104 and to provide an inter-application navigation user interface configured to facilitate user navigation between one or more of the applications that have been accessed by processing facility 104. Accordingly, inter-application navigation facility 112 may allow a user to conveniently, intuitively, and quickly navigate from one application to another application that has been accessed by processing facility 104. Such navigation from one application to another application as facilitated by inter-application navigation facility 112 may be referred to as "teleporting" from one application to another. Examples of inter-application navigation and inter-application navigation interfaces are described in more detail further below.

In certain embodiments, inter-application navigation facility 112 may be configured to run one or more background processes on a device. Accordingly, one or more of the inter-application navigation operations described herein may be configured to run in the background of device processing. As an example, an inter-application navigation user interface may be generated and/or may wait in the background of device processing and may be moved from the background to the foreground of device processing in response to predefined user input. Examples of such predefined user input are described further below.

Figure 2:
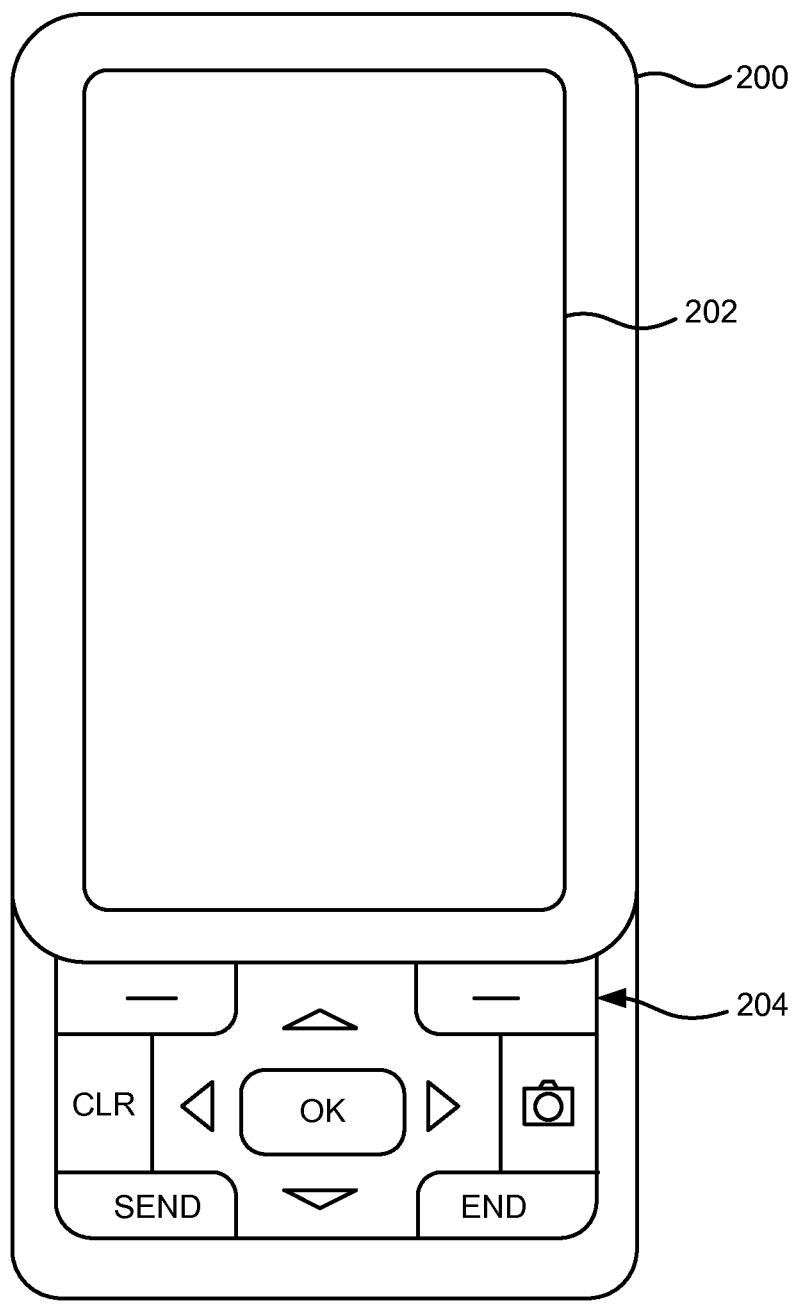
FIG. 2 illustrates an exemplary device having the system of FIG. 1 implemented therein.

System 100 may be implemented by one or more computing devices and/or in any other suitable manner. For example, FIG. 2 illustrates an exemplary device 200 having system 100 implemented thereon. Device 200 may include one or more of the facilities 102-112 shown in FIG. 1 and may be configured to perform one or more of the processes and/or operations described herein. Device 200 may include, but is not limited to, a mobile device (e.g., a mobile phone device), media device, handheld device, computer, gaming device, phone device (e.g., Verizon Hub device), communications device, navigation device (e.g., a GPS device), entertainment device, vehicular device, personal-digital assistant, digital camera, tablet computing device (e.g., a tablet personal computer), a touch screen device, a touch screen device controlling a heads-up display of a communicatively connected computing device (e.g., a handheld touch screen device paired to a television or personal computer and driving a display associated with the television or personal computer), and any other computing device capable of accessing multiple applications. These examples are illustrative only. In other embodiments, system 100 may be implemented on other devices or types of devices.

As shown in FIG. 2, device 200 may include a touch screen display 202 configured to display one or more GUIs for viewing by a user of device 200. Touch screen display 202 may be included in I/O facility 108 and may include single-touch and/or multi-touch touch screen technologies. Examples of GUIs and various GUI views that may be displayed on touch screen display 202 are described in detail further below. In addition to touch screen display 202, device 200 may include other input mechanisms such as one or more of the input buttons 204 shown in FIG. 2.

Figure 3:
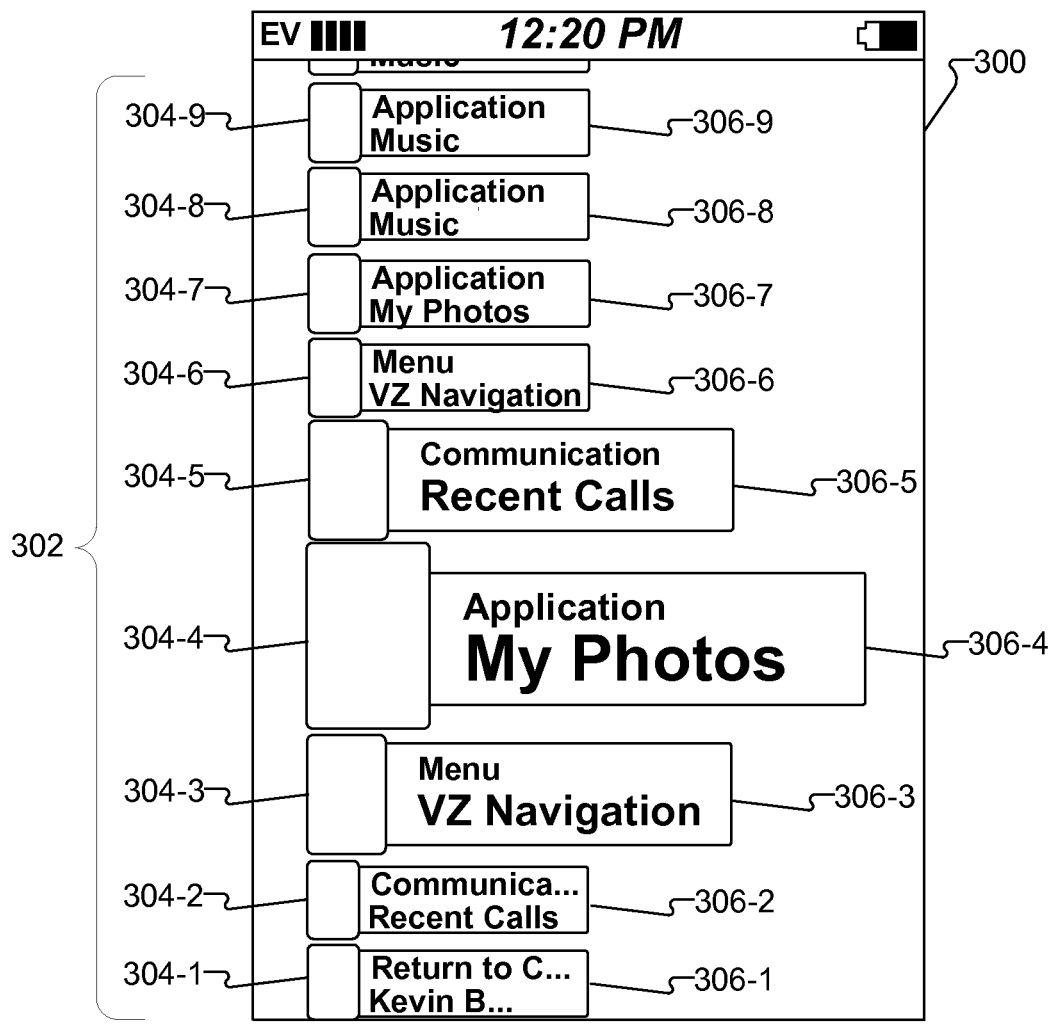
FIG. 3 illustrates an exemplary inter-application navigation user interface.

FIG. 3 illustrates an exemplary inter-application navigation user interface 300 that may be displayed on touch screen display 202 of device 200. The display of inter-application navigation user interface 300 on touch screen display 202 of device 200 is illustrative only. Inter-application navigation user interface 300 or variations thereof may be displayed on other display screens of other devices implementing system 100.

Inter-application navigation user interface 300 may include a slideable list 302 of a plurality of graphical objects 304 (e.g., graphical objects 304-1 through 304-9) representing a plurality of applications accessed by device 200. Graphical objects 304 may be user selectable such that a user of device 200 (e.g., a subscriber to a service accessible via device 200) may provide input to select a graphical object (e.g., by touching and releasing a graphical object displayed on touch screen display 202) to cause device 200 to navigate (i.e., teleport) to the application corresponding to the selected graphical object 304. For example, a user may select graphical object 304-5 to cause device 200 to navigate to a communications application referred to as "recent calls," or the user may select graphical object 304-7 to cause device 200 to navigate to a data management application referred to as "my photos." Navigation to an application based on user input received in inter-application navigation user interface 300 may include accessing of the application by device 200. For example, a GUI associated with the selected application may be activated and/or displayed at the forefront of touch screen display 202 of device 200. An example of navigating from one application to another application in response to user input received in an inter-application navigation user interface is described in more detail further below.

Graphical objects 304 may be arranged in a particular order in slideable list 302. Accordingly, the slideable list 302 may be referred to as a slideable, ordered list of graphical objects 304 representing accessed applications. As an example, graphical objects 304 may be arranged in slideable list 302 based on an application access history specifying an order by which applications have been accessed by device 200. In FIG. 3, for example, the illustrated order of graphical objects 304 may represent a reverse chronological order in which the applications represented by the graphical objects 304 have been accessed by device 200, beginning with a most recently accessed application represented by graphical object 304-1. A user may therefore readily see when a particular application represented by one of the graphical objects 304 was accessed by device 200 in relation to applications represented by the other graphical objects 304 displayed in inter-application navigation user interface 300. For example, the user may see that device 200 accessed an application represented by graphical object 304-9 prior to any of the applications represented by graphical objects 304-1 through 304-8.

In certain embodiments, a graphical object 304 representing the most recently accessed application may be positioned at an endpoint of slideable list 302 of graphical objects 304. For example, graphical object 304-1 may be positioned at an endpoint of slideable list 302 and may represent the most recently accessed application. Earlier accessed applications may be represented by other graphical objects 304 (e.g., graphical objects 304-2 through 304-9) positioned progressively away from the graphical object 304-1 located at the endpoint of slideable list 302 based on the application access history.

An ordering of graphical objects 304 within inter-application navigation user interface 300 based on an order in which the corresponding applications have been accessed is illustrative only. Other ordering may be employed in other embodiments. For example, graphical objects 304 may be ordered within inter-application navigation user interface 300 based on frequency of usage of applications, alphabetically by application name, a combination of factors such as access order and frequency of usage, and/or any other factors as may suit a particular implementation. In certain embodiments, a heuristic used to determine an ordering of graphical objects 304 representing applications may be customizable by an end user, such as a user of device 200.

An application access history, which may be used to select applications to be represented in slideable list 302 and/or to order representations of applications within slideable list 302, may be generated by device 200 in any suitable way. For example, inter-application navigation facility 114 may be configured to detect and log application access events such as when applications are requested, launched, activated, instantiated, closed, terminated, etc. In some examples, this may include detecting and logging when a GUI associated with an application is made an active window and/or displayed at the forefront of touch screen display 202 of device 200. Inter-application navigation facility 114 may generate an application access history based on the detected and/or logged application access events. The application access history may specify one or more applications accessed by device 200 as well as an order by which the applications have been accessed by device 200. Accordingly, the application access history may be used to select one or more applications to be represented in slideable list 302 and/or to order graphical objects 304 representative of the applications within slideable list 302.

As shown in FIG. 3, inter-application navigation user interface 300 may further include a plurality of label tabs 306 (e.g., label tabs 306-1 through 306-9) associated with the plurality of graphical objects 304. Each label tab 306 may be positioned adjacent to and extend away from a corresponding graphical object 304 as shown in FIG. 3. In addition, each label tab 306 may provide a visual indication of the application corresponding to the graphical object 304. For example, label tab 306-4 indicates that an application called "my photos" is represented by graphical object 304-4. Accordingly, a user may ascertain that a user selection of graphical object 304-4 and/or label tab 306-4 may cause device 200 to access the "my photos" application.

Display sizes of graphical objects 304 and/or label tabs 306 may be varied within inter-application navigation user interface 300. In certain embodiments, for example, display sizes of graphical objects 304 and/or label tabs 306 may vary based on proximity of graphical objects 304 and/or label tabs 306 to a location within inter-application navigation user interface 300. In some examples, the display sizes of graphical objects 304 and/or label tabs 306 may progressively decrease with increased distance from a location within inter-application navigation user interface 300. To illustrate, in FIG. 3, graphical object 304-4 and label tab 306-4 may be located most proximate to a particular location within inter-application navigation user interface 300. Accordingly, the display sizes of graphical object 304-4 and label tab 306-4 may be larger than the display sizes of other graphical objects 304 and label tabs 306 in inter-application navigation user interface 300. As shown in FIG. 3, the display sizes of other graphical objects 304 and label tabs 306 in inter-application navigation user interface 300 progressively decrease with increased distance from the location to which graphical object 304-4 and label tab 306-4 are most proximate. For example, graphical object 304-5 and label tab 306-5, which are located adjacent to graphical object 304-4 and label tab 306-4 in inter-application navigation user interface 300, are relatively smaller in display size than graphical object 304-4 and label tab 306-4, respectively. In turn, graphical object 304-6 and label tab 306-6, which are located adjacent to graphical object 304-5 and label tab 306-5 in inter-application navigation user interface 300, but are located farther away from graphical object 304-4 and label tab 306-4 than are graphical object 304-5 and label tab 306-5, are relatively smaller in display size than graphical object 304-5 and label tab 306-5, respectively. In certain embodiments, varying of display sizes of label tabs 306 may include extending label tabs 306 various distances away from graphical objects 304.

A location to be used to dictate varying display sizes of graphical objects 304 and/or label tabs 306 may be identified in any suitable way. For example, as part of generating and/or displaying inter-application navigation user interface 300, inter-application navigation facility 114 may identify a location within inter-application navigation user interface 300. In some examples, a predefined default location may be selected. For instance, when inter-application navigation user interface 300 is generated, a location of a graphical object 304 and/or a label tab 306 located at an endpoint of slideable list 302 of graphical objects 304 may be selected as a default location. In other examples, the location may be identified based on user input. For instance, a user may provide input indicating a selection of a graphical object 304 and/or a label tab 306 within inter-application navigation user interface 300. In response, the location of the graphical object 304 and/or label tab 306 within inter-application navigation user interface 300 may be selected to dictate display sizes of graphical objects 304 and/or label tabs 306 in inter-application navigation user interface 300. To illustrate, when a user of device 200 selects graphical object 304-4 or label tab 306-4 in inter-application navigation user interface 300, the location of graphical object 304-4 or label tab 306-4 may be identified and the display sizes of the graphical objects 304 and/or label tabs 306 in inter-application navigation user interface 300 set to the sizes shown in FIG. 3 based on proximity to the identified location. The display sizes of one or more of the graphical objects 304 and/or label tabs 306 may be subsequently adjusted in response to a selection of another location within inter-application navigation user interface 300 (e.g., a user selection of another graphical object 304 or label tab 306 within 300).

As mentioned, graphical objects 304 may represent applications accessed by device 200. Additionally or alternatively, one or more graphical objects 304 may represent particular instances and/or sections of applications accessed by device 200. Accordingly, slideable list 302 may represent more granular levels of application access events that may occur within a particular instance and/or section of an application. This may be helpful for representing particular past activities of a user of device 200. As an example, graphical object 304-5 may represent an access of a "recent calls" section within a voice communications application. As another example, graphical object 304-8 may represent an instance of a "music" application accessed by device 200, and graphical object 304-9 may represent another instance of the same "music" application accessed by device 200. As yet another example, graphical object 304-1 may represent a particular voice call instance (e.g., a current call between device 200 and another phone device) within a voice communications application accessed by device 200. These examples of more granular instances and/or sections of applications that may be represented in inter-application navigation user interface 300 are illustrative only. Other accessed instances and/or sections of applications may be represented in inter-application navigation user interface 300 in other embodiments.

In certain examples, graphical objects 304 within inter-application navigation user interface 300 may represent one or more applications being executed by device 200 and one or more applications not being executed by device 200 when inter-application navigation user interface 300 is displayed. Accordingly, a user of device 200 is not limited to using inter-application navigation user interface 300 only to cause device 200 to navigate to applications currently executing on the device 200. Rather, the user may utilize inter-application navigation user interface 300 to selectively cause device 200 to navigate to a currently executing application or a currently non-executing application (e.g., an application previously executed by device 200 but not being executed by device 200 while inter-application navigation user interface 300 is displayed). To illustrate, graphical object 304-1 may represent a voice call application that is being executed by device 200 while inter-application navigation user interface 300 is displayed, and graphical object 304-4 may represent a "my photos" application that was previously accessed but is not being executed by device 200 while inter-application navigation user interface 300 is displayed. The capability to represent both currently executing and non-executing applications in inter-application navigation user interface 300 may be supported by generation and utilization of a complete application access history to generate inter-application navigation user interface 300, as described above.

Device 200 may detect user input received in conjunction with inter-application navigation user interface 300, such as user input received while inter-application navigation user interface 300 is displayed and/or touch screen input received within inter-application navigation user interface 300 displayed on touch screen display 202. Device 200 may perform one or more predefined operations in response to user input associated with inter-application navigation user interface 300. As an example, in response to certain user input, device 200 may visually slide the slideable list 302 within inter-application navigation user interface 300. For instance, slideable list 302 shown in FIG. 3 may be visually slid in a generally vertical direction to represent scrolling through graphical objects 304 within slideable list 302. As another example, in response to certain user input indicating a highlight-type selection of a graphical object 304 or label tab 306, device 200 may adjust inter-application navigation user interface 300 such that the selected graphical object 304 and/or label tab 306 become a focal point of inter-application navigation user interface 300. This may be accomplished in any suitable way, such as by adjusting sizes of graphical objects 304 and/or label tabs 306 by proximity to a location associated with the selected graphical object 304 and/or label tab 306. FIG. 3 illustrates inter-application navigation user interface 300 as it may be displayed in response to a highlight selection of graphical object 304-4 or label tab 306-4. As another example, in response to certain user input indicating an access-type selection of a graphical object 304 or label tab 306, device 200 may access the application corresponding to the selected graphical object 304 or label tab 306. In certain embodiments, accessing of the application may include activating and/or transitioning to a display of a GUI associated with the application, an example of which is described further below.

To help facilitate an understanding of inter-application navigation using an inter-application navigation user interface such as inter-application navigation user interface 300, FIGS. 4-9 illustrate a sequence of GUI views that may be displayed on a display screen such as touch screen display 202 of device 200. While FIGS. 4-9 are described with reference to device 200, this is illustrative only and not limiting. Other devices implementing system 100 may operate similarly to produce the GUI views shown in FIGS. 4-9.

Figure 4:
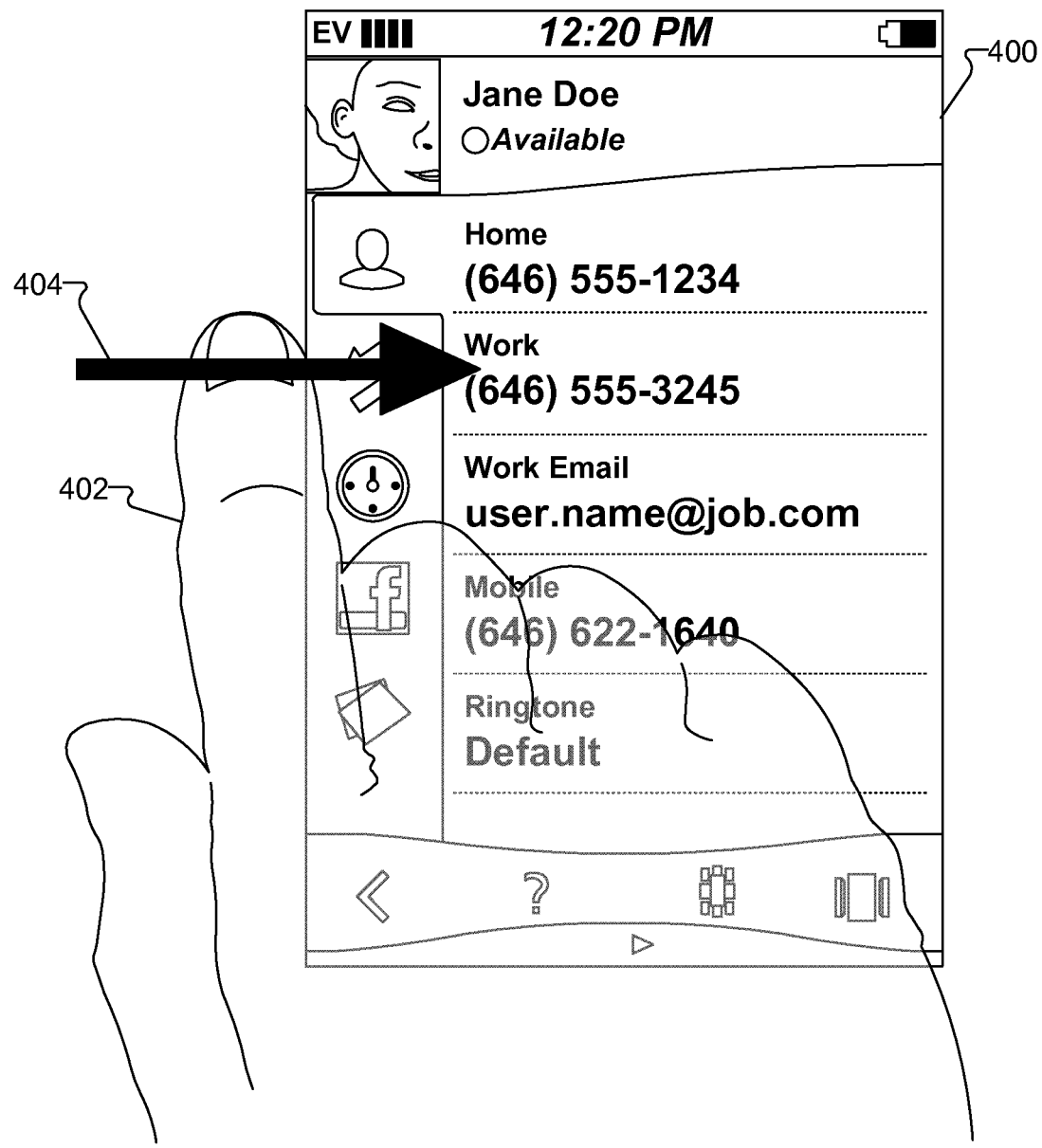
FIGS. 4-9 illustrate a sequence of graphical user interface views associated with an inter-application navigation user interface facilitating navigation between applications available to a device.

FIG. 4 illustrates a GUI 400 that may be displayed on touch screen display 202 of device 200. GUI 400 may be associated with an application being accessed by device 200 and may be displayed as an active GUI at the forefront of touch screen display 202 and ready to receive user input associated with the application being accessed. In the illustrated example, GUI 400 is associated with a "contacts" application, and more particularly with a contact record for a contact named "Jane Doe" and that is being accessed within the contacts application.

While GUI 400 is displayed on touch screen display 202, a user may provide user input indicating a request to launch an inter-application navigation user interface. For example, FIG. 4 illustrates a finger 402 of a user performing a predefined touch gesture, such as a generally horizontal left-to-right directional touch gesture indicated by arrow 404, across at least a portion of touch screen display 202 while GUI 400 is displayed thereon. The generally left-to-right directional touch gesture indicated by arrow 404 in FIG. 4 is illustrative only. Any other suitable predefined touch gesture or multi-touch gesture may be used. Device 200 may detect the predefined touch gesture user input on the touch screen display 202 and respond by generating and displaying an inter-application navigation user interface on the touch screen display 202. In certain embodiments, device 200 may be configured to animate a movement of an inter-application navigation user interface from an off-screen position to an on-screen position. The animation may coincide with a movement of the inter-application navigation user interface in substantially the same direction as the predefined touch gesture directional user input. For example, a predefined multi-touch gesture may invoke an on-screen spiral-based animation and/or inter-application navigation user interface.

Figure 5:
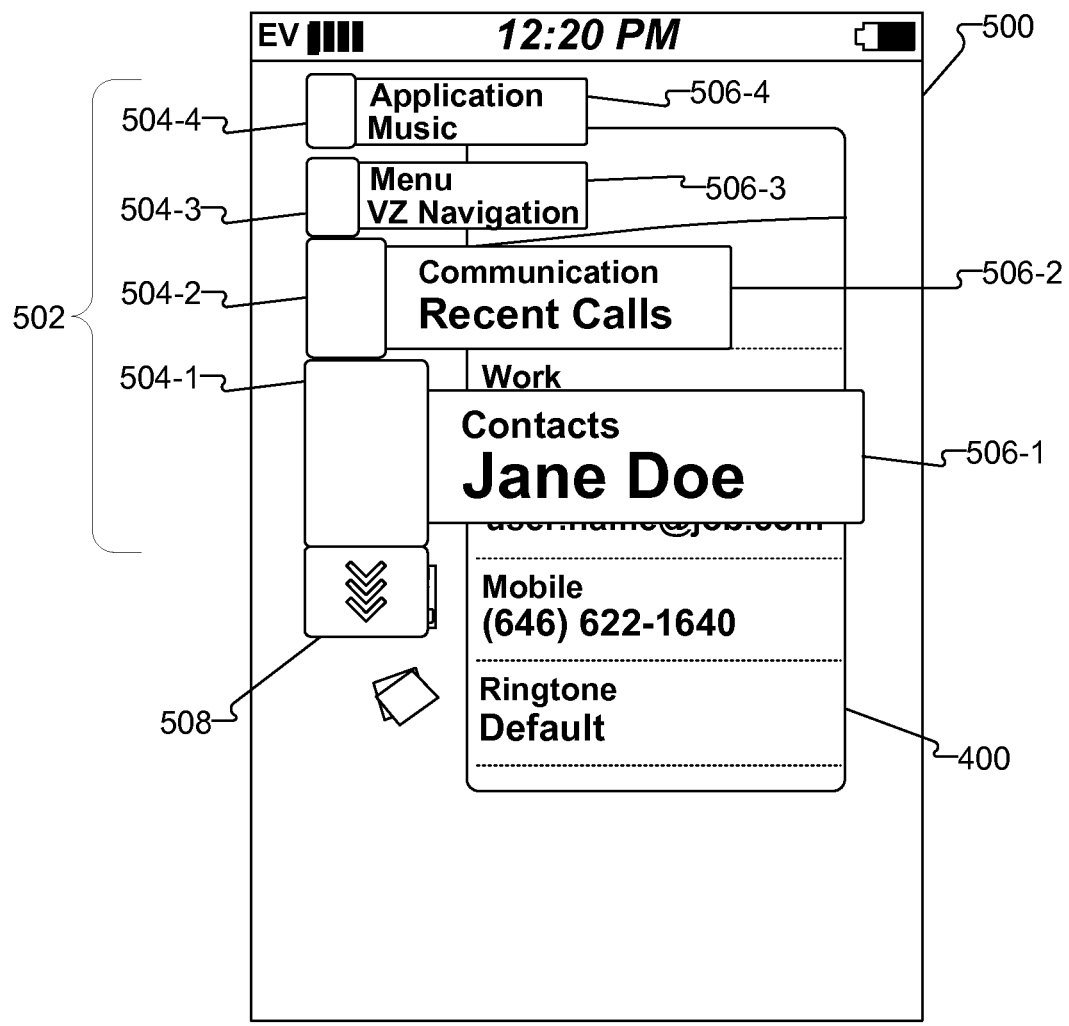

FIG. 5 illustrates an exemplary inter-application navigation user interface 500 that may be displayed on touch screen display 202 in response to the predefined touch gesture user input detected during display of GUI 400. As shown, inter-application navigation user interface 500 may include a slideable list 502 of a plurality of graphical objects 504 (e.g., graphical objects 504-1 through 504-4) representing a plurality of applications accessed by device 200, as well as a plurality of label tabs 506 (e.g., label tabs 506-1 through 506-4) associated with graphical objects 504 and visually indicating the applications corresponding to graphical objects 504. In the illustrated example, graphical object 504-1 and label tab 506-1 are associated with the particular contact record ("Jane Doe") accessed within a contacts application in FIG. 4. Graphical object 504-1 and label tab 506-1 are positioned at an endpoint of slideable list 502 based on the corresponding "Jane Doe" contact record being the most recently accessed of the applications represented by graphical objects 504. A visual endpoint indicator 508 may be displayed adjacent to endpoint graphical object 504-1 as shown in FIG. 5. Visual endpoint indicator 508 may also indicate a capability to visually slide the slideable list 502 of graphical objects 504 in a downward direction.

In certain examples, inter-application navigation user interface 500 may be displayed as an overlay of one or more other GUIs displayed on touch screen display 202. As shown in FIG. 5, for example, inter-application navigation user interface 500 may overlay GUI 400 such that at least a portion of GUI 400 remains visible. In certain embodiments, inter-application navigation user interface 500 may include a semitransparent overlay that may be displayed in the forefront of one or more other GUIs displayed on touch screen display 202. This may allow a user of device 200 to continue to view at least part of the previous GUI displayed on touch screen display 202.

Figure 6:
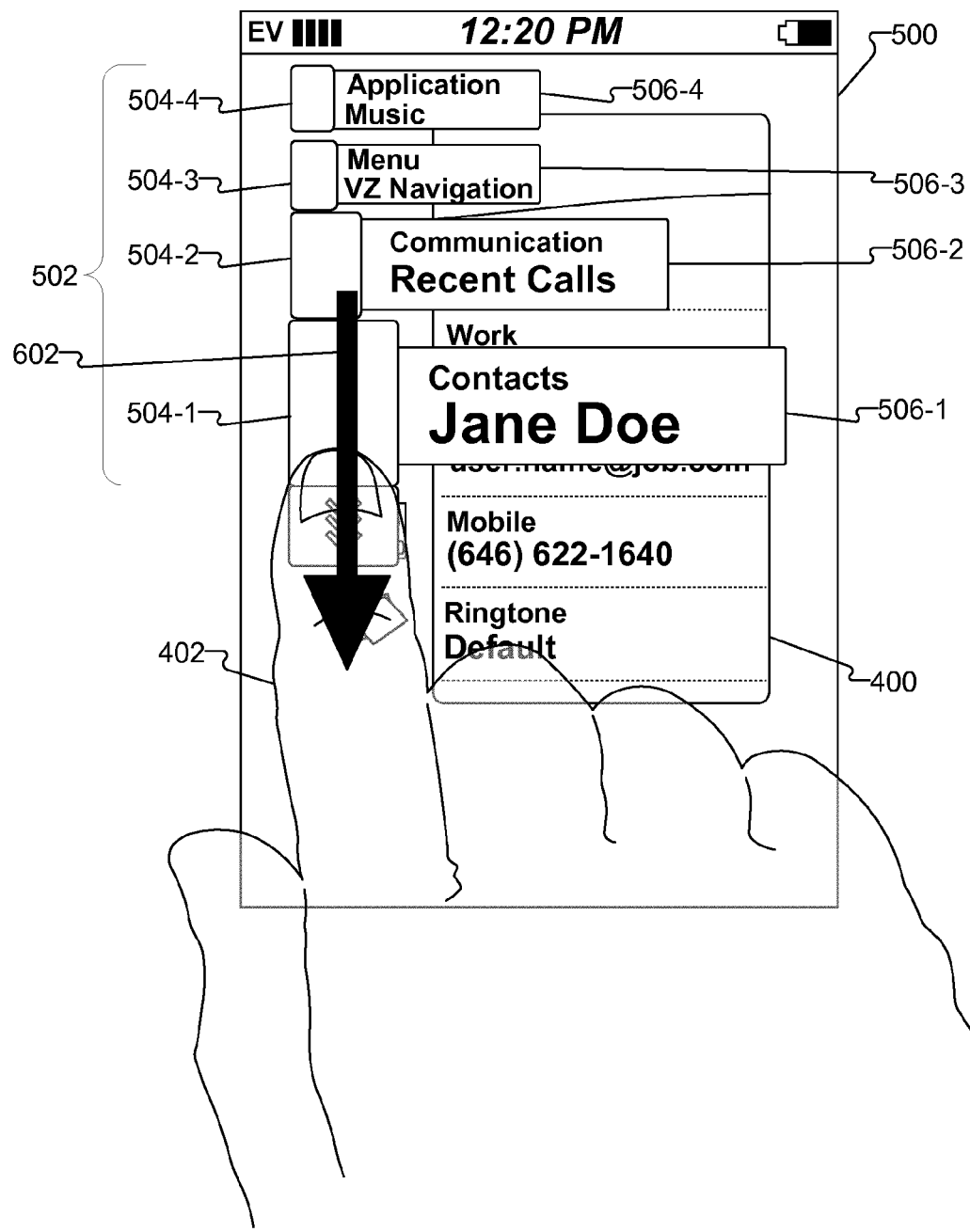

A user of device 200 may provide user input while inter-application navigation user interface 500 is displayed as shown in FIG. 5. For example, FIG. 6 illustrates a finger 402 of a user performing a predefined touch gesture, such as a generally vertical downward touch gesture indicated by arrow 602, across at least a portion of touch screen display 202 while inter-application navigation user interface 500 is displayed thereon. The downward touch gesture may be performed across one or more of the graphical objects 504 or label tabs 506 displayed in inter-application navigation user interface 500. Alternatively, the downward touch gesture may drag one or more of the graphical objects 504 or label tabs 506 downward in conjunction with the downward movement of finger 402.

Figure 7:
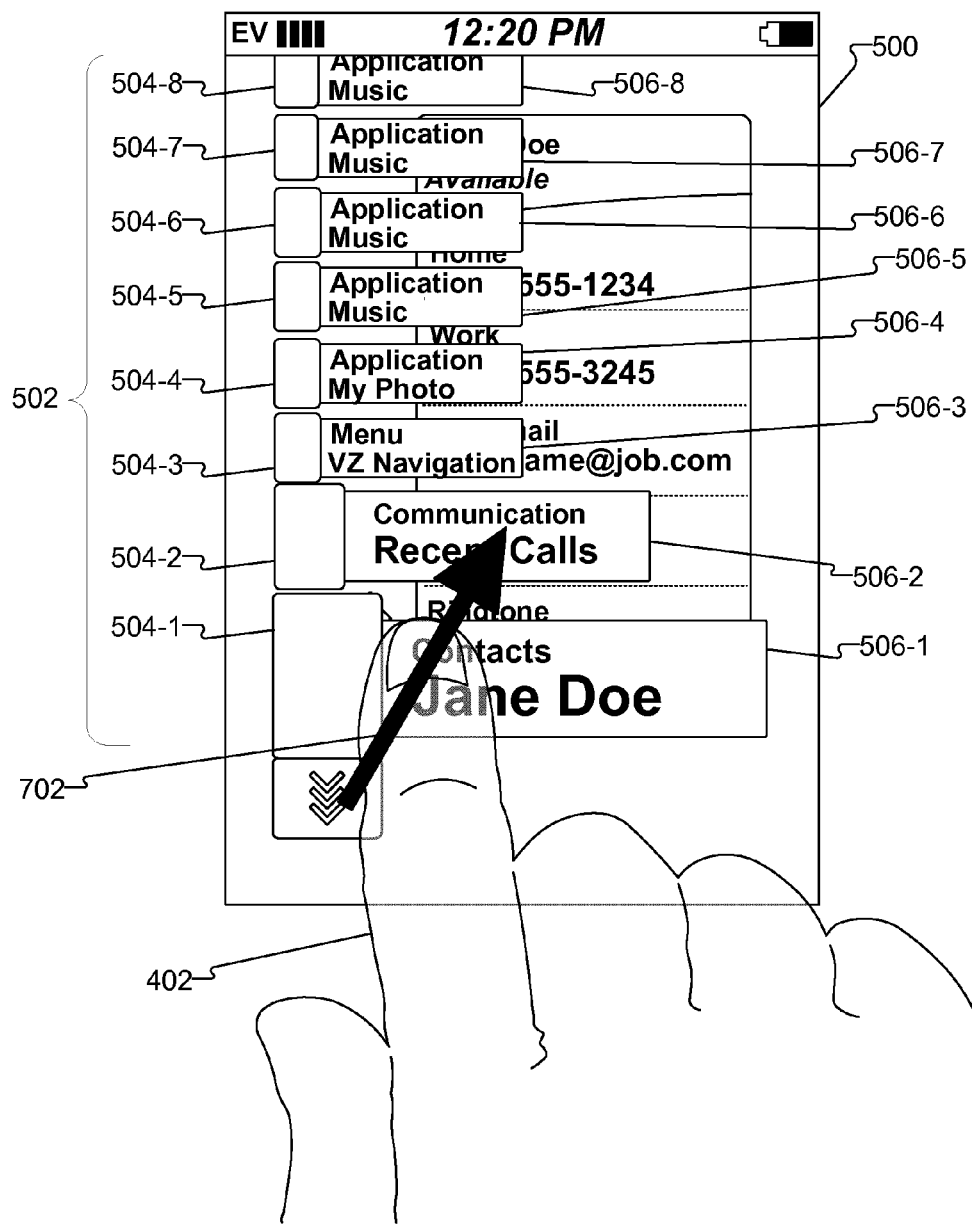

Device 200 may detect the predefined downward touch gesture user input on the touch screen display 202 and respond by visually sliding the slideable list 502 of graphical objects 504 downward within inter-application navigation user interface 500 on the touch screen display 202. FIG. 7 illustrates inter-application navigation user interface 500 as it may be displayed on touch screen display 202 after device 200 has visually slid the slideable list 502 of graphical objects 504 downward in response to the user input 602 shown in FIG. 6. As shown in FIG. 7, inter-application navigation user interface 500 now includes more graphical objects 504 (e.g., graphical objects 504-1 through 504-8) and corresponding label tabs 506 (e.g., label tabs 506-1 through 506-8) displayed within the slideable list 502. In this or similar manner, slideable list 502 may be visually slid within inter-application navigation user interface 500 by device 200 to allow a user to scroll through entries included in the slideable list 502.

A user of device 200 may provide user input while inter-application navigation user interface 500 is displayed as shown in FIG. 7. For example, FIG. 7 illustrates a finger 402 of a user moving to a particular label tab 506-2 as indicated by arrow 702. The movement may include sliding finger 402 along touch screen display 202 or removing finger 402 from touch screen display 202, moving finger along arrow 702 while above touch screen display 202, and touching finger 402 to touch screen display 202 at label tab 506-2. Other suitable ways of selecting label tab 506-2 for highlighting may be used in other examples.

Device 200 may detect the user input selecting label tab 506-2 for highlighting and may respond by making graphical object 504-2 and/or label tab 506-2 a focal point of inter-application navigation user interface 500. For example, display sizes of one or more graphical objects 504 and/or label tabs 506 may be adjusted as described above based on graphical object 504-2 and/or label tab 506-2 being a new focal location within inter-application navigation user interface 500.

Figure 8:
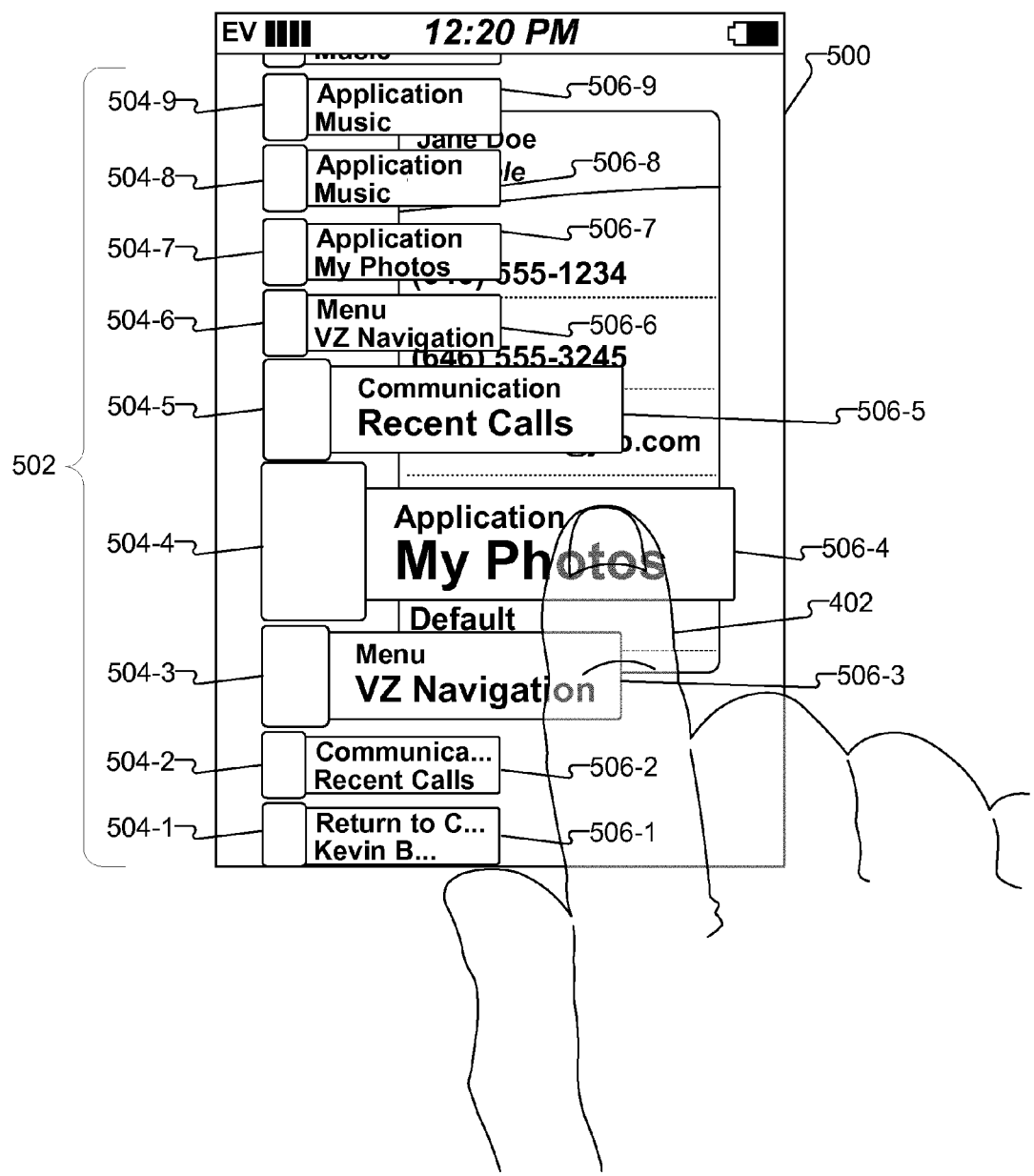

A user of device 200 may continue to provide user input within inter-application navigation user interface 500 to scroll through slideable list 502 and/or to select one or more graphical objects 504 and/or label tabs 506 for highlighting within inter-application navigation user interface 500. A user may also select a graphical object 504 or label tab 506 to indicate a selection of the application corresponding to the graphical object 504 or label tab 506 for accessing. To illustrate, FIG. 8 shows inter-application navigation user interface 500 displayed on touch screen display 202 and including slideable list 502 of graphical objects 504 (e.g., graphical objects 504-1 through 504-9) and corresponding label tabs 506 (e.g., label tabs 506-1 through 506-9) displayed therein. A user may select an application represented in inter-application navigation user interface 500 for accessing by selecting a graphical object 504 or label tab 506 associated with the application. In FIG. 8, a finger 402 of a user of device 200 is in a position to indicate a selection of label tab 506-4 associated with a "my photos" application. The selection of label tab 506-4 may be made in any suitable way, including, without limitation, finger 402 touching the touch screen display 202 at a location associated with label tab 506-4 or finger 402 releasing from touching the touch screen display 202 at a location associated with label tab 506-4. For instance, when user lifts finger 402 off of label tab 506-4, device 200 may detect a user selection of the "my photos" application associated with label tab 506-4 for accessing by device 200. In response, device 200 may navigate to or otherwise access the "my photos" application.

Figure 9:
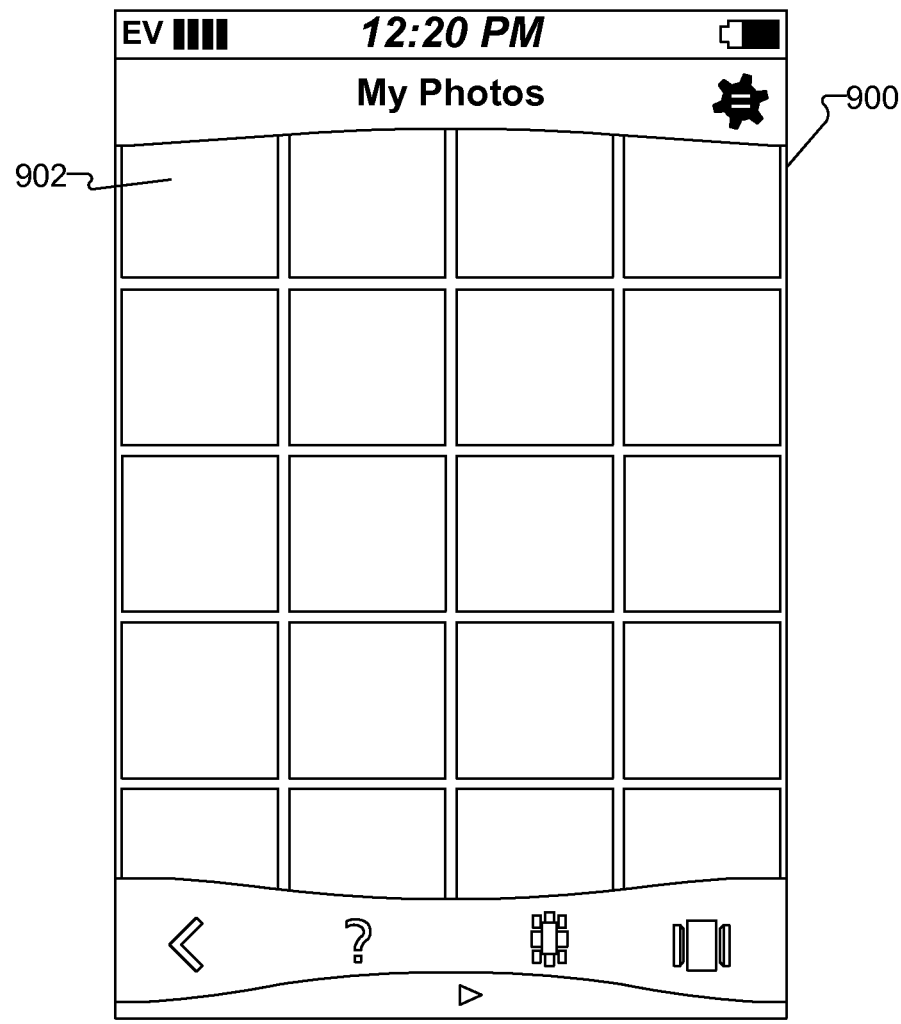

Accessing of an application selected in inter-application navigation user interface 500 may include launching and/or transitioning to a display of a GUI associated with the application. For example, in response to a user selection of the "my photos" application associated with graphical object 504-4 and label tab 506-4 in inter-application navigation user interface 500, device 200 may launch and/or transition to a display of a GUI associated with the "my photos" application. To illustrate, FIG. 9 shows a GUI 900 associated with a "my photos" application displayed on touch screen display 202 of device 200. GUI 900 may include a plurality of thumbnail images, such as thumbnail image 902, representing one or more photo records associated with the "my photos" application.

In certain examples, accessing of an application selected in inter-application navigation user interface 500 may include transitioning from a display of a GUI associated with a previously accessed application to a display of a GUI associated with the application selected in inter-application navigation user interface 500. For example, in response to a user selection of the "my photos" application in inter-application navigation user interface 500, device 200 may transition from a display of GUI 400 associated with a "contacts" application and displayed on touch screen display 202 to a display of GUI 900 associated with the "my photos" application selected in inter-application navigation user interface 500. In certain embodiments, the transition from one GUI to another GUI as part of navigating from one application to another may be animated on touch screen display 202.

While FIGS. 4-9 show a sequence of GUIs illustrative of providing an inter-application navigation user interface to facilitate navigation from one application to another application, the example is illustrative only. Inter-application navigation user interface 300, inter-application navigation user interface 500, or other inter-application navigation user interfaces may be provided and may similarly facilitate navigation to one or more applications accessed by device 200.

Figure 10:
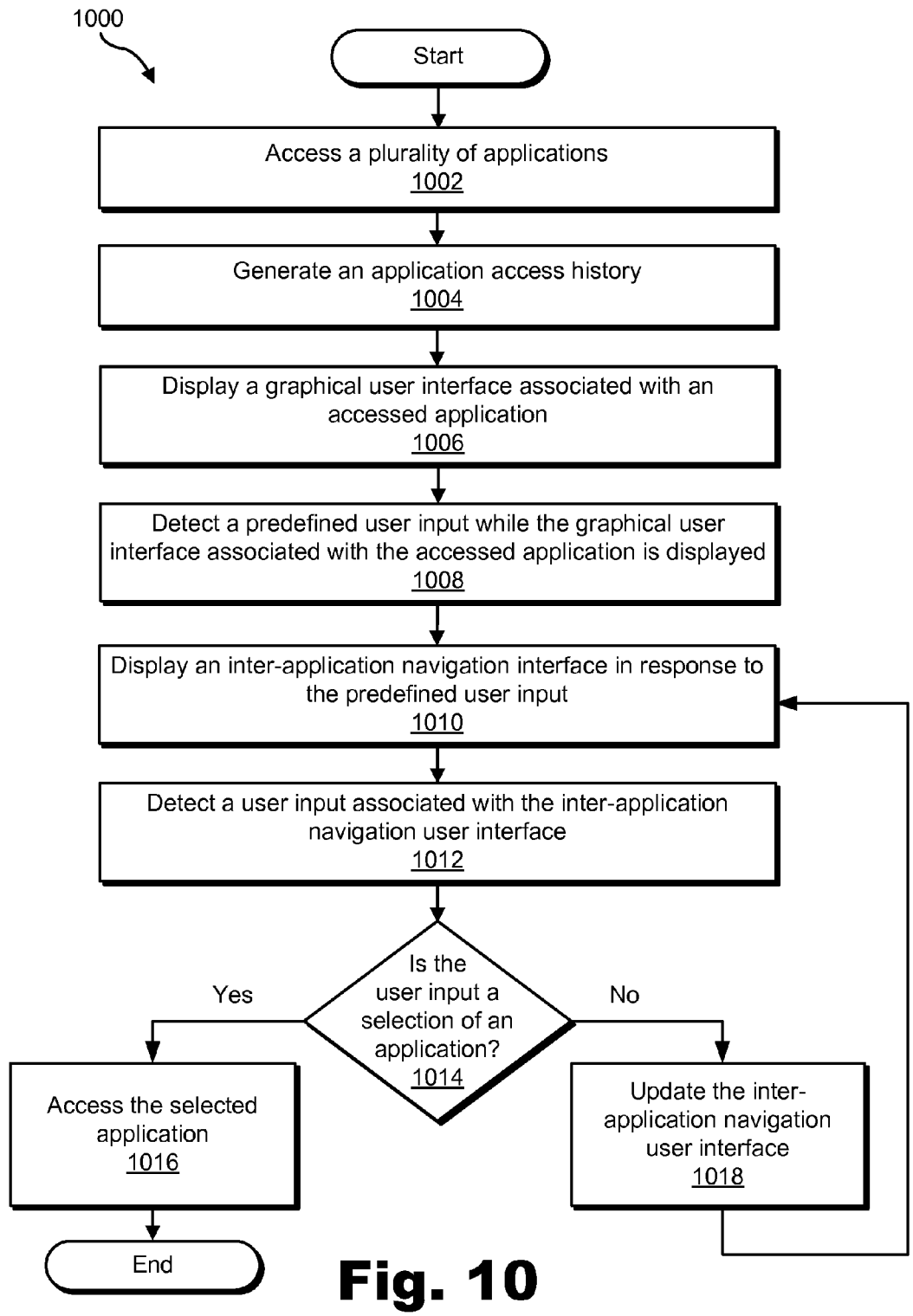
FIG. 10 illustrates an exemplary inter-application navigation method.

FIG. 10 illustrates an exemplary inter-application navigation method 1000. While FIG. 10 illustrates exemplary steps according to one embodiment, other embodiments may omit, add to, reorder, and/or modify any of the steps shown in FIG. 10. One or more of the steps shown in FIG. 10 may be performed by system 100, processing facility 104, inter-application navigation facility 114, a computing system, and/or device 200.

In step 1002, a plurality of applications may be accessed. For example, one or more applications within applications facility 110 of system 100 may be accessed in any of the ways described above.

In step 1004, an application access history may be generated. For example, inter-application navigation facility 114 may generate an application access history in any of the ways described above.

In step 1006, a GUI associated with an accessed application may be displayed. For example, the GUI associated with an accessed application may be displayed as an active window on a display device as described above.

In step 1008, a predefined user input may be detected while the GUI associated with the accessed application is displayed. For example, I/O facility 108 may detect a predefined user input (e.g., a predefined touch gesture) provided by a user while the GUI associated with the accessed application is displayed on a display device.

In step 1010, an inter-application navigation user interface may displayed in response to the predefined user input detected in step 1008. For example, inter-application navigation facility 114 may respond to the predefined user input by generating and providing an inter-application navigation user interface for display on a display device. The inter-application navigation user interface may comprise any of the elements of inter-application navigation user interface 300 or 500 described above and may be configured to facilitate navigation between previously accessed applications as described above.

In step 1012, a user input associated with the inter-application navigation user interface may be detected. The user input may include any of the examples of inter-application navigation user interface input described above. Other suitable user inputs may be used in conjunction with the inter-application navigation user interface in other embodiments.

In step 1014, a determination may be made as to the type of user input detected in step 1012. If the user input includes a selection of an application for accessing, processing may continue to step 1016. In step 1016, the selected application may be accessed in any of the ways described above to navigate to the application. After step 1016, processing may end, and the inter-application navigation user interface may be closed.

On the other hand, if the user input does not include a selection of an application for accessing at step 1014, other processing may be performed. For example, processing may continue from step 1014 to step 1018. In step 1018, the inter-application navigation user interface displayed in step 1010 is updated. For instance, the inter-application navigation user interface may be updated by visually sliding a slideable list of graphical objects within the inter-application navigation user interface and/or by adjusting display sizes of one or more elements within the inter-application navigation user interface as described above. From step 1018, processing returns to step 1010, in which the updated inter-application navigation user interface is displayed.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
  receiving, by a computing system, user input to access a plurality of applications;
  accessing, by the computing system, the plurality of applications in response to the user input, the accessing of the plurality of applications comprising accessing a plurality of instances within at least one of the applications;
  logging, by the computing system, a plurality of application access events associated with the plurality of applications, the plurality of application access events comprising each occurrence of:
    a launching of an application in response to user input to access the application to initiate execution of the application by the computing system,
    an activation of the application to display a graphical user interface of the application at a forefront of a display associated with the computing system, and
    a closing of the application to terminate execution of the application by the computing system;
  displaying, by the computing system at the forefront of the display associated with the computing system, a graphical user interface of a most recently accessed application being executed by the computing system;
  detecting, by the computing system, a predefined user input on the displayed graphical user interface;
  displaying, by the computing system on the display associated with the computing system and in response to the predefined user input on the displayed graphical user interface, an inter-application navigation user interface including a plurality of user-selectable graphical objects representing the plurality of applications accessed by the computing system, the plurality of user-selectable graphical objects including a user-selectable graphical object representing each accessed instance within the at least one of the applications, the displaying of the inter-application navigation user interface comprising:
generating an application access history specifying a chronological or reverse-chronological order by which the plurality of applications have been accessed based on a most recent application access event for each application included in the plurality of applications,
arranging the user-selectable graphical objects in a slideable list within the inter-application navigation user interface in the chronological or reverse-chronological order specified by the application access history,
displaying the slideable list as a semitransparent overlay on the graphical user interface displayed at the forefront of the display,
identifying a focal location of the slideable list, the focal location comprising one of the user-selectable graphical objects included in the plurality of user-selectable graphical objects, and
varying display sizes of the plurality of user-selectable graphical objects by proximity to the focal location, the display sizes of the plurality of user-selectable graphical objects progressively decreasing with increased distance from the focal location;
detecting, by the computing system, a user input associated with the inter-application navigation interface;
visually sliding, by the computing system, the slideable list of user-selectable graphical objects within the inter-application navigation interface in response to the user input; and
maintaining, by the computing system, the one of the user selectable graphical objects as the focal location during the sliding of the slideable list,
wherein the plurality of applications represented by the plurality of user-selectable graphical objects in the inter-application navigation user interface includes an application being executed by the computing system and an application not being executed by the computing system when the inter-application navigation user interface is displayed.

2. The method of claim 1, wherein:
a user-selectable graphical object within the plurality of user-selectable graphical objects and representing the application being executed by the computing system is positioned at an endpoint of the slideable list; and
a user-selectable graphical object within the plurality of user-selectable graphical objects and representing the application not being executed by the computing system is positioned away from the endpoint of the slideable list based on the application access history.

3. The method of claim 1, wherein the displaying of the inter-application navigation user interface further comprises displaying a plurality of label tabs in the inter-application navigation user interface, each label tab extending away from a corresponding user-selectable graphical object within the plurality of user-selectable graphical objects in the slideable list and providing a visual indication of the application or accessed instance corresponding to the user-selectable graphical object.

4. The method of claim 3, wherein the displaying of the inter-application navigation user interface further comprises:
varying display sizes of the label tabs by proximity of the label tabs to the focal location, the label tabs progressively decreasing in display size with increased distance from the focal location.

5. The method of claim 1, further comprising:
detecting, by the computing system, a user selection of a user-selectable graphical object from within the plurality of user-selectable graphical objects;
determining, by the computing system, whether the user selection of the user-selectable graphical object is an access-type selection or a highlight-type selection;
accessing, by the computing system in response to a determination that the user selection is the access-type selection, an application within the plurality of applications or an instance within the plurality of instances, the application or instance corresponding to the selected user-selectable graphical object; and
updating, by the computing system in response to a determination that the user selection is the highlight-type selection, the focal location of the slideable list to be the selected user-selectable graphical object.

6. The method of claim 1, further comprising:
detecting, by the computing system, another user input within the inter-application navigation interface; and
adjusting, by the computing system, display sizes of the user-selectable graphical objects within the inter-application navigation interface in response to the another user input within the inter-application navigation interface.

7. The method of claim 1, embodied as computer-executable instructions on at least one non-transitory computer-readable medium.

8. The method of claim 5, wherein the one of the user-selectable graphical objects included in the plurality of user-selectable graphical objects and identified as the focal location of the slideable list comprises the most recently accessed application.

9. The method of claim 1, wherein
the at least one of the applications comprises at least one of a voice communications application, a messaging application, an address book application, and a calendar application, and
the accessed plurality of instances within the at least one of the applications comprises at least one of:
a plurality of particular voice call instances within the voice communications application,
a plurality of particular message instances within the messaging communications application,
a plurality of particular contact data records within the address book application, and
a plurality of particular calendar instances within the calendar application.

10. A method comprising:
receiving, by a mobile device, user input to access a plurality of applications;
accessing, by the mobile device, the plurality of applications in response to the user input to access the plurality of applications, the accessing of the plurality of applications comprising accessing a plurality of instances within at least one of the applications;
logging, by the mobile device, a plurality of application access events associated with the plurality of applications, the plurality of application access events comprising each occurrence of:
a launching of an application in response to user input to access the application to initiate execution of the application by the mobile device, an activation of the application to display a graphical user interface of the application at a forefront of a touch screen display of the mobile device, and a closing of the application to terminate execution of the application by the mobile device;

displaying, by the mobile device at the forefront of the touch screen display of the mobile device, a graphical user interface of a most recently accessed application being executed by the mobile device;

detecting, by the mobile device, a predefined touch gesture user input on the touch screen display while the graphical user interface of the most recently accessed application is displayed;

displaying, by the mobile device and in response to the predefined touch gesture user input on the displayed graphical user interface, an inter-application navigation user interface on the touch screen display, the inter-application navigation user interface including a plurality of user-selectable graphical objects representing the plurality of applications accessed by the mobile device, the plurality of user-selectable graphical objects including a user-selectable graphical object representing each accessed instance within the application, the displaying of the inter-application navigation user interface comprising:

generating an application access history specifying a chronological or reverse-chronological order by which the plurality of applications have been accessed based on a most recent application access event for each application included in the plurality of applications, arranging the user-selectable graphical objects in a slideable ordered list within the inter-application navigation user interface in the chronological or reverse-chronological order specified by the application access history, displaying the slideable list as a semitransparent overlay on the graphical user interface associated with the accessed application and displayed at the forefront of the touch screen display, identifying a focal location of the slideable ordered list, the focal location comprising one of the user-selectable graphical objects included in the plurality of user-selectable graphical objects, and varying display sizes of the plurality of user-selectable graphical objects by proximity to the focal location, the display sizes of the plurality of user-selectable graphical objects progressively decreasing with increased distance from the focal location;

detecting, by the mobile device, a user input touch gesture within the inter-application navigation interface;

visually sliding, by the mobile device, the slideable ordered list of user-selectable graphical objects within the inter-application navigation interface in response to the user input touch gesture; and maintaining, by the mobile device, the one of the user selectable graphical objects as the focal location during the sliding of the slideable ordered list, wherein the plurality of applications accessed by the mobile device comprises the most recently accessed application associated with the displayed graphical user interface and at least one other accessed application, the most recently accessed application is being executed by the mobile device when the inter-application navigation user interface is displayed, the at least one other accessed application is not being executed by the mobile device when the inter-application navigation user interface is displayed, the mobile device accessed the plurality of applications by performing one or more operations associated with execution of the plurality of the applications, the application comprises a voice communications application, a messaging application, an address book application, or a calendar application, and the plurality of instances within the application comprises a plurality of particular voice call instances within the voice communications application, a plurality of particular message instances within the messaging communications application, a plurality of particular contact data records within the address book application, or a plurality of particular calendar instances within the calendar application.

11. The method of claim 10, wherein:

the plurality of user-selectable graphical objects comprises a user-selectable graphical object representing the accessed application and at least one other user-selectable graphical object representing the at least one other accessed application;

the user-selectable graphical object is positioned at an endpoint of the slideable ordered list; and the at least one other user-selectable graphical object is positioned progressively away from the endpoint of the slideable ordered list based on the application access history.

12. The method of claim 10, wherein the displaying of the inter-application navigation user interface further comprises displaying a plurality of label tabs in the inter-application navigation user interface, each label tab extending away from a corresponding user-selectable graphical object within the plurality of user-selectable graphical objects in the slideable ordered list and providing a visual indication of the application or accessed instance corresponding to the user-selectable graphical object.

13. The method of claim 10, further comprising:

detecting, by the mobile device, a user input touch on the touch screen display and within the inter-application navigation interface; and varying, by the mobile device, display sizes of the user-selectable graphical objects by proximity of the user-selectable graphical objects to a location of the user input touch, the user-selectable graphical objects progressively decreasing in display size with increased distance from the location of the user input touch.

14. The method of claim 10, further comprising:

detecting, by the mobile device, a user selection of a user-selectable graphical object from within the plurality of user-selectable graphical objects; and accessing, by the mobile device and in response to the user selection, another application within the plurality of applications, the another application corresponding to the selected user-selectable graphical object.

15. The method of claim 14, wherein the accessing of the another application comprises transitioning from the display of the graphical user interface associated with the accessed application to a display of another graphical user interface associated with the another application.

16. A system comprising:

at least one computing device comprising:

a processing facility comprising one or more processors that receives user input to access a plurality of applications, accesses the plurality of applications in response to the user input to access the plurality of applications, the accessing of the plurality of application comprising accessing a plurality of instances within at least one of the applications, and displays, at a forefront of a display screen associated with the computing device, a graphical user interface of a most recently accessed application being executed by the computing device; and an inter-application navigation facility communicatively connected to the processing facility and that directs the processing facility to:

detect a plurality of application access events, the plurality of application access events comprising each occurrence of:

a launching of an application in response to user input to access the application to initiate execution of the application by the computing device, an activation of the application to display a graphical user interface of the application at the forefront of the display screen associated with the computing device, and a closing of the application to terminate execution of the application by the computing device, log the plurality of application access events, detect a predefined user input on the displayed graphical user interface of the most recently accessed application, provide, for display on the display screen and in response to the predefined user input on the display graphical user interface of the most recently accessed application, an inter-application navigation user interface including a plurality of user-selectable graphical objects representing the plurality of applications and the plurality of instances accessed by the processing facility, by:

generating, based on the detected plurality of application access events, an application access history specifying a chronological or reverse-chronological order by which the plurality of applications have been accessed based on a most recent application access event for each application included in the plurality of applications, arranging the user-selectable graphical objects in a slideable list within the inter-application navigation user interface in the chronological or reverse-chronological order specified by the application access history, displaying the slideable list as a semitransparent overlay on the graphical user interface displayed at the forefront of the display screen, identifying a focal location of the slideable list, the focal location comprising one of the user-selectable graphical objects included in the plurality of user-selectable graphical objects, and varying display sizes of the plurality of user-selectable graphical objects by proximity to the focal location, the display sizes of the plurality of user-selectable graphical objects progressively decreasing with increased distance from the focal location, detect a user input associated with the inter-application navigation interface, visually slide the slideable list of user-selectable graphical objects within the inter-application navigation interface in response to the user input, and maintain the one of the user selectable graphical objects as the focal location during the sliding of the slideable list;

wherein the plurality of applications represented by the plurality of user-selectable graphical objects in the inter-application navigation user interface includes an application being executed by the processing facility and an application not being executed by the processing facility when the inter-application navigation user interface is displayed.

17. The system of claim 16, wherein the at least one computing device comprises a mobile phone device having a touch screen display.

18. The system of claim 16, wherein the inter-application navigation facility further directs the processing facility to:

detect a user selection of a user-selectable graphical object from within the plurality of user-selectable graphical objects within the inter-application navigation user interface, and access an application within the plurality of applications or an instance within the plurality of instances, the application or instance corresponding to the selected user-selectable graphical object.

* * * * *